United States Patent [19]

Mitzel

[11] 4,251,067
[45] Feb. 17, 1981

[54] STACKER FOR FLAT SHEET MATERIAL SUCH AS BANKNOTES, BANK PAPERS, RECEIPTS AND THE LIKE

[75] Inventor: Wilhelm Mitzel, Neukeferloh, Fed. Rep. of Germany

[73] Assignee: GAO Gesellschaft fur Automation und Organisation mbH, Munich, Fed. Rep. of Germany

[21] Appl. No.: 50,976

[22] Filed: Jun. 22, 1979

[30] Foreign Application Priority Data

Dec. 12, 1978 [DE] Fed. Rep. of Germany ....... 2853538

[51] Int. Cl.³ .............................................. B65H 29/24
[52] U.S. Cl. ..................................... 271/196; 271/314

[58] Field of Search ............... 271/196, 194, 195, 197, 271/278, 314, 177–181, 184–187, 306, 82, 315, 276, 69, 279; 414/72, 73, 106, 107; 198/689

[56] References Cited

U.S. PATENT DOCUMENTS

| 1,269,673 | 6/1918 | Armstrong ........................... 271/178 |
| 3,380,353 | 4/1968 | Mittermayer .................... 271/100 X |
| 4,073,487 | 2/1978 | Schirrmeister et al. ......... 271/196 X |

Primary Examiner—Bruce H. Stoner, Jr.
Attorney, Agent, or Firm—Andrus, Sceales, Starke & Sawall

[57] ABSTRACT

A stacker for flat material sheets unfolds dog-eared sheets to facilitate stacking. The rotating stacker drum has a cut out preceding the sheet adhering suction openings with an unfolding face and a run-in face.

8 Claims, 4 Drawing Figures

U.S. Patent  Feb. 17, 1981  4,251,067
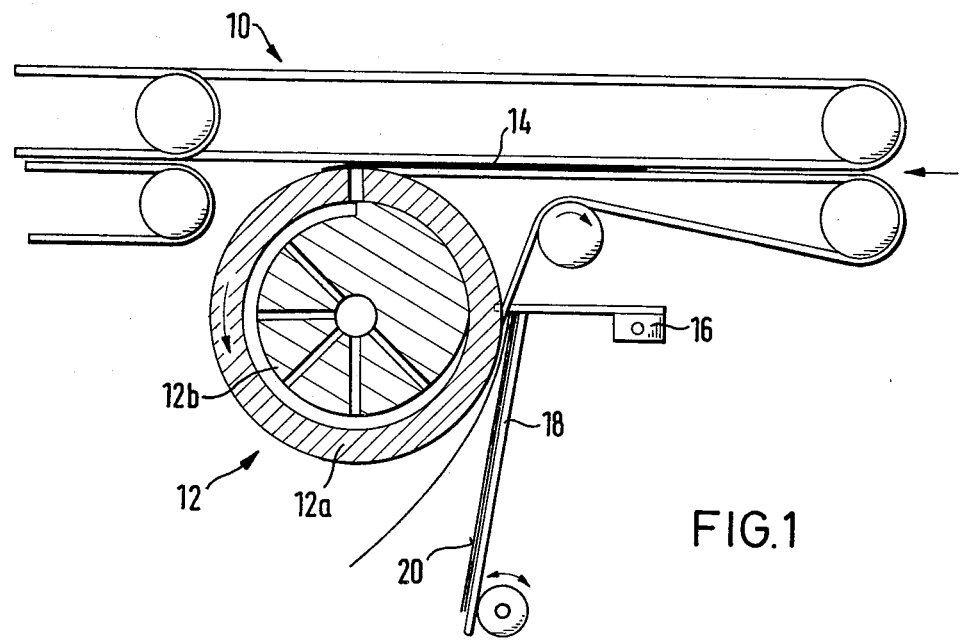
FIG.1
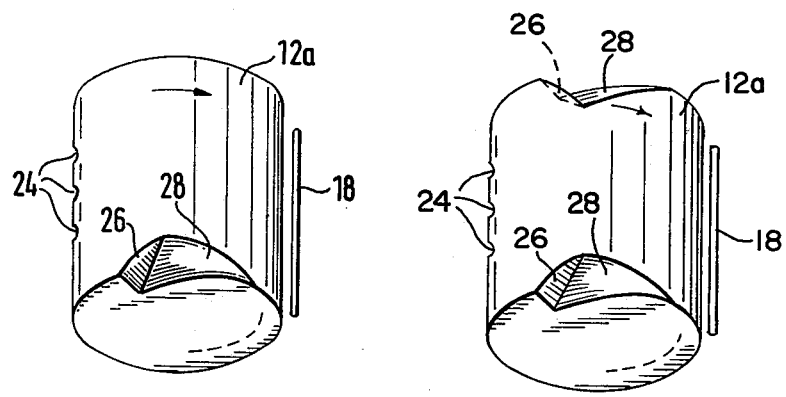
FIG.2
FIG.4
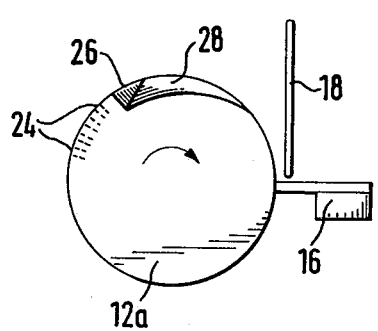
FIG.3

STACKER FOR FLAT SHEET MATERIAL SUCH AS BANKNOTES, BANK PAPERS, RECEIPTS AND THE LIKE

BACKGROUND OF THE INVENTION

The invention relates to a stacker for flat sheet material such as banknotes, bankpapers, receipts and the like with a cylindrical stacker drum and a transport system, placed tangentially with respect to the stacker drum, and the stacker drum is designed for taking up the sheet material by way of a line of suction openings at its front or leading edge, for pulling the material out of the transport system by turning, moving the material as far as a drum clearer and lastly freeing it for forming a stack, and the leading edge part is pushed flatly by a pushing plate elastically and springingly against the stacker drum.

Such a stacker is part of the prior art, as may be seen, for example, from the German Offenlegungsschrift specification No. 2,555,306. The sheet material, for example banknotes, is run to the stacker drum by way of a belt transporter system tangentially. The leading edge of the banknote is taken up by suction holes, placed in a line on the outer face of the drum, moved round on the drum and out of the transport system and run on to a takeup stack. The stacking is undertaken by moving the leading edge of the banknote as far as a clearing unit stretching up to the outer face of the drum. The clearing unit is used for gripping and stopping the banknote while the drum goes on turning. While stacking is taking place, the stack formed so far is pushed by an elastic pushing plate near the front or leading end of the stack with a low degree of force against the turning stacker drum.

The stacker drum and the transport rollers of the belt transport system are supported on a plate, which may be vertical or horizontal. In the case of a horizontal system, the takeup stack has one long-edge resting on the plate or on a guide of the necessary design.

Dependent on the condition of the banknotes to be stacked, it may be that one or more corners are bent or crumpled forming "dog's ears". If such bent corners are at the leading edge of the banknote in question, that is to say that edge, which is run up against the clearing unit, the stacking of the notes coming after it may be unorderly. The bent corner is in fact something getting in the way of the leading edge, gripped by the suction openings of the stacker drum, of the next banknote, so that the banknote will go into a position at an angle to its desired position, or be turned upwards, before going to the clearing unit. More specially, if the bent corner is at the side, resting on the support plate, of the stack (that is to say the lower edge in the case of a horizontally placed plate), there will be a danger of one or more of the banknotes moved by the stacker drum towards the clearing unit, being hooked by the dog's ear near the lower edge end, because near the top edge they are further transported without anything in their way, at the back they will be turned upwards. Dependent on the size of the bent corner, the trailing end of the banknote will be positioned sticking out of the stack to a greater or lesser degree. On further processing of the stack of banknotes or, for example, on placing label bands round them, such sticking out parts of notes will be the cause of much trouble.

SUMMARY OF THE PRESENT INVENTION

One purpose of the invention is that of smoothing out bent or crumpled corners of the sheet material, and to put an end to any folds in it, which otherwise would be a cause of trouble on stacking.

For effecting this and other purposes there is the measure in the present invention that the outer drum face has, in the direction of turning before the suction openings, a cutout, which has a generally radially running unfolding face and, in the direction of turning in front of the unfolding face, a run-in face.

With this system it is possible to make certain that the bent corner, pointing towards the stacker drum, is run into the cutout, while the drum is turning, and is in fact taken up by the unfolding face and unfolded. The leading edge of the next banknote is, for this reason, moved as far as the clearing unit without being run up against the bent corner.

Further development of the invention of good effect are detailed in the dependent claims.

BRIEF DESCRIPTION OF THE DRAWING

An account will now be given of one working example of the invention making use of the accompanying figures.

FIG. 1 is a diagrammatic side view of the stacker.

FIG. 2 is a perspective view of the stacker drum with the cutout.

FIG. 3 is a front view of the stacker drum with the cutout, in which respect the clearing unit and the pusher plate are only presented diagrammatically.

FIG. 4 is a perspective view of another embodiment of the stacker drum.

DETAILED DESCRIPTION OF THE PREFERRED EMBODIMENT

FIG. 1 is a view of one part of the belt transport system 10 with different transport rollers or pulleys and with the stacker drum 12. The material transported, in the present case a banknote 14, is moved in the arrowed direction into the unit viewed of the belt transport system 10 and then goes tangentially towards the stacker drum 12.

The stacker drum is made up of a turning rotor 12a, which is drivingly joined with the driving system itself, and a stator 12b, which has the function of a suction air controller or valve part. Normally the stator is fixed on a support plate, not viewed in the figure. The support plate is, as a rule, horizontally placed, so that the banknotes are run through the transport system on edge.

As furthermore will be seen from FIG. 1 with a spacing of about 270° from, that is to say after, the banknote takeup position, there is a clearing unit 16 for stopping and clearing the leading edge of the banknote 14, moved round on the stacker drum 12, from the drum. In the direction of turning right in front of the unit 16 there is a pusher plate 18, which is turningly supported. The pusher plate 18 has the function of pushing the end, which is to the front when looked at in the direction of turning, of a formed banknote stack 20 against the turning rotor 12a.

The turning of the incoming chain of banknotes is responsible for such spacing between notes and is so fixed in relation to the smoothly turning rotor 12a, that the suction openings 24 (FIG. 2) are completely covered by the leading edge of each banknote. The suction openings are joined by way of connection airways with a suction air valve or airway in the stator 12b and are joined with the vacuum system as a banknote is moved round on the drum as far as the clearing unit 16. Shortly before the leading edge of a banknote comes to the clearing unit 16, the suction is cut off, so that the banknote 14 is placed in an orderly stack 20.

The stack is taken from the apparatus by hand when necessary and, as part of further work on it, done up with a paper label band.

The rotor (drum casing) 12a will now be gone into in more detail, making use of FIGS. 2 and 3.

The drum 12a has a cutout stretching from its lower end face and formed by an unfolding face 26 and a run-in face or hollow 28. The unfolding face 26 is, generally speaking, radial, a drum radius at this end being the generatrix of this face. In the working example of the invention viewed, this face is at an angle of 45° to the straight line generatrix of the cylinder outer face, although the angle may be less than 45°, or the face may be parallel to the generatrix.

The run-in face 28 is curved or domed and goes as far as the lower edge of the unfolding face 26. It is limited on the one hand by part of a helical line on the outer face of the drum 12a and, on the other hand, by a curved line at the end face of the drum 12a, this line running from the lower end (the radially inner end) of the cutout tangentially in the outer face of the drum. The run-in face 28, as looked at in the direction of turning of the drum, is in front of the unfolding face 26. The length of the run-in face in the peripheral direction is about 90° about the axis of the drum. Generally speaking the run-in face is to be as long as is possible, but, however, its size is normally limited by design points of view with respect to certain airways inside the drum.

Not only the radial depth of the cutout, but furthermore the height are to be in line with the size of the bent corners of the material transported. In the case of the example viewed, in which banknotes are stacked, the depth of the cutout is about 10 to 15 mm, while, on the other hand, the height is about 20 to 25 mm.

An account will now be given of the workings of the drum 12a. On a banknote being placed on the stack 12, which has a front lower bent corner resting against the stopper 16 and pointing towards the drum 12a, the front or leading edge of the next banknote would firstly be run up against the fold in the corner, before getting as far as the clearing unit 16, and, for this reason, turned into an upright position at the trailing edge. With the help of the cutout the bent corner is now in fact made flat and such a turning upwards of the banknote is not possible.

In front of the leading edge of the banknote, which is generally at the suction openings 24, the cutout is placed. There now comes the run-in face 28, which is opened for the bent corner and lets a certain unfolding of the corner towards the drum 12a take place. On further turning of the drum 12a taking place, the unfolding face 26 comes up behind the bent corner pushing it further on in the direction of turning till the bent corner has been smoothed out and unfolded completely. Because the banknotes in the stack are all the time being pushed against the stacker drum in the leading edge part by the pusher plate 18, it is possible to make certain that the banknotes are not folded out of the working range of the stacker drum cutout, while the bent corner is being "ironed out flat" and that a bent corner, once made flat, is not able to be folded back again.

The sloping position of the unfolding face at 45° to the lines on the cylinder outer face parallel to the axis is designed to be in line with the sloping fold in a normal bent banknote corner, so that the top edge of the unfolding face comes up against the bent corner over its complete length. Any destruction of the banknote paper by overgreat forces on it at certain points is stopped because of this part of the design. The leading edge of the next banknote coming right after the banknote in mind, and which is fixed in position by the suction openings 24, will be slipped without any trouble over and past the smoothed out bent corner and be run as far as the clearing unit 16 without the banknote being turned upwards and backwards.

The quality of the stack, more specially in the case of used banknotes in a poor condition, is made very much better for these reasons. Bent corners at the back end of a banknote will not have any effect on the stack quality. For smoothing out the bent corners at the top front part of the banknote in the stack it is generally possible for a second cutout to be present in the casing of the drum 12a, this second cutout being opposite to the first cutout and being at the same distance from the line of suction openings 24. Because bent corners at the top of the banknotes are not a cause of the banknotes being turned upwards, and because the presence of a second cutout will have the effect of limiting use of the stacker to banknotes of generally the same width, the use of such a cutout in the top edge part of the cylinder will only be of use in special cases.

The faces of which an account has been given in connection with the working example of the invention to be seen in the figures do not necessarily have to have the form given and it is in order if the run-in face makes possible an unfolding of the bent corner, so that the generally radially placed unfolding face may come up behind it. The unfolding face is best made with a form the same as the form of a bent corner which is to be unfolded or unrolled. The face may be spherical or flat and the angles it makes with the outer face of the stacker drum may be as desired.

For making the machining of the cutout simpler it may, for example, be produced by a sectorial right angled cut, whose end, furthest from the suction openings, takes the form of the unfolding face 26. The unfolding face may, in this respect, be produced by putting an insert, produced of plastics or the like, in the right angled sectorial cut, to make the design even simpler.

I claim:

1. A stacker for flat material sheets having corners subject to folding, said stacker including a rotatable stacker drum for receiving sheets at a first position and for depositing the sheets on a stack at a second position having a pressure plate for pressing the sheets against the drum, said drum having suction openings in the exterior thereof for adhering the sheets to the drum, said drum having a corner unfolding cutout on the exterior of the drum ahead of the suction openings in the direction of rotation of the drum, said cutout comprising an unfolding face preceded by a run-in face, the projection of said unfolding face on the end of said drum generally forming a radius of said drum, said cutout being so located on said drum as to engage the folded corners of the sheets in the stack when the stack is pressed against the drum by the pressure plate.

2. A stacker as claimed in claim 1 wherein said unfolding face is generally triangular in configuration, said drum radius forming a base side of said triangle, the intersection of the face on the exterior of said drum forming another side of said triangle, and the intersection with said run-in face forming the third side, said run-in face also being generally triangular in configuration and defined by said line of intersection with said unfolding face, a generally arcuate line running from the radially inner end of said drum radius to a tangent on the exterior of said drum, and a generally helical line extending between the apex of said unfolding face and the end of the generally arcuate line.

3. A stacker as claimed in claim 1 wherein said unfolding face lies at an angle of about 45° with respect to the axis of the drum.

4. A stacker as claimed in claim 1 wherein said cutout is located along the edge of said drum.

5. A stacker as claimed in claim 1 wherein said unfolding face and run-in face are planar.

6. A stacker as claimed in claim 1 or 5 wherein said cutout is formed such that the angle between the unfolding face and run-in face is approximately 90°.

7. A stacker as claimed in claim 1 wherein said cutout is formed by an insert in the exterior of the drum.

8. A stacker as claimed in claim 1 or 4 having a pair of cutouts for engaging spaced folded corners of the sheets, said cutouts extending toward each other on the exterior of the drum.

* * * * *